United States Patent [19]

Tada et al.

[11] Patent Number: 4,662,711
[45] Date of Patent: May 5, 1987

[54] HOLOGRAPHIC LIGHT GUIDE

[75] Inventors: Koji Tada; Yoshiki Kuhara, both of Osaka, Japan

[73] Assignee: Sumitomo Electric Industries, Ltd., Osaka, Japan

[21] Appl. No.: 841,041

[22] Filed: Mar. 17, 1986

Related U.S. Application Data

[62] Division of Ser. No. 421,654, Sep. 22, 1982.

[30] Foreign Application Priority Data

Sep. 22, 1981 [JP] Japan ............................ 56-150024

[51] Int. Cl.$^4$ .......................... G02B 6/10; G03H 1/02
[52] U.S. Cl. ............................... 350/96.12; 350/3.61; 350/96.34
[58] Field of Search ................... 350/3.61, 3.62, 3.64, 350/3.7, 96.11, 96.12, 96.13, 96.34, 320

[56] References Cited

U.S. PATENT DOCUMENTS 4,120,569 10/1978 Richards, Jr. ...................... 350/3.68
4,138,189 2/1979 Huignard et al. ................... 350/3.64
4,400,616 8/1983 Chevillat et al. ............... 350/3.61 X

FOREIGN PATENT DOCUMENTS 136774 7/1979 German Democratic Rep. ................... 350/96.11

OTHER PUBLICATIONS

Wüthrich et al., *Applied Physics*, vol. 21, No. 1, Jan. 1980, "Holography with Guided Optical Waves", pp. 55-64.

Verber et al., *Conference Proc. of the Society of Photo-Optical Instrumentation Engineers*, Wash., D.C., 7-18 Apr. 1979, "Proposed Smart . . . ", pp. 204-209.

Petrov et al., *SPIE Proc. Soc. Photo-Opt. Instrum. Eng. (USA)*, 1979, "Holographic Writing and Image Processing in $Bi_{12}SiO_{20}$ Crystals", pp. 44-49.

Sato et al., *Applied Optics*, vol. 22, No. 6, Mar. 1983, "Coherent Optical Image Delay Device Using a BSO . . . ", pp. 815-818.

*Primary Examiner*—William L. Sikes
*Assistant Examiner*—Frank González
*Attorney, Agent, or Firm*—Sughrue, Mion, Zinn, Macpeak and Seas

[57] ABSTRACT

A method of making a holographic light guide comprising, in sequence, a substrate, a light guiding layer and a holographic recording layer that partially replaces the light guiding layer is disclosed. The substrate is made of a first bismuth sillenite group substance. The light guiding layer is made of a second bismuth sillenite group substance that has a higher refractive index than the first bismuth sillenite group substance and absorbs little of the light being guided. The holographic recording layer is made of a third bismuth sillenite group substance that has a higher refractive index than the first bismuth sillenite group substance and has a degree of photosensitivity.

5 Claims, 2 Drawing Figures

FIG. 1
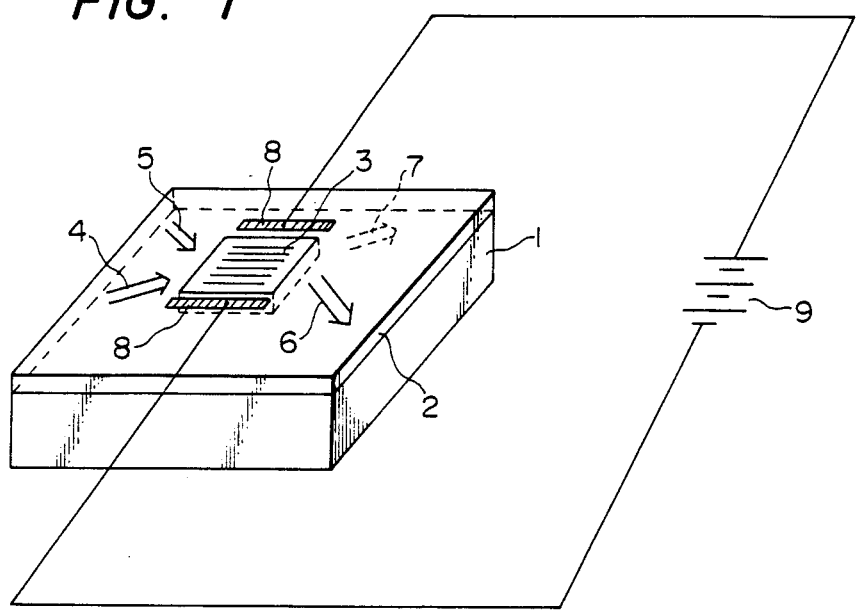
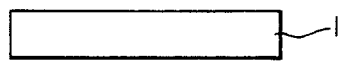
FIG. 2(a)
FIG. 2(b)
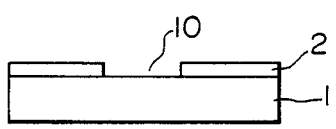
FIG. 2(c)
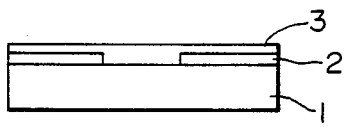
FIG. 2(d)
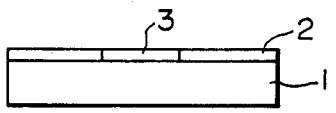
FIG. 2(e)

HOLOGRAPHIC LIGHT GUIDE

STATUS OF RELATED APPLICATIONS

This is a divisional application of Ser. No. 06/421,654, filed Sept. 22, 1982.

FIELD OF THE INVENTION

The present invention relates to a holographic light or optical guide that can be packed in an optical IC and which is capable of high sensitivity recording, reconstruction or erasure of holograms.

BACKGROUND OF THE INVENTION

Holographic recording or reconstruction using a beam of coherent light such as that from a He—Ne laser is capable of recording and reproducing a large quantity of information, and holograms can be used as a grating to diffract light. To achieve these results, many optical devices that can record or reconstruct holograms are being developed.

Particularly, intensive efforts are being made to develop holographic devices that can be packed in optical ICs which are small, light and have a high recording density. Typical of the types under development are ones that use a thin As, Se or Te base amorphous film and ones that use a $LiNbO_3$ waveguide layer having Ti diffused therein. However, the former type is based on a change in phase between the amorphous state and the crystalline state, and is not satisfactory with respect to fidelity and long-term stability. The $LiNbO_3$ layer used in the latter type has very low photosensitivity. Therefore, neither type of holographic device has been put to commercial use.

SUMMARY OF THE INVENTION

The primary object of the present invention is to provide a new holographic light guide that is free from the defects of conventional products. This object can be achieved by using a bismuth sillenite group substance and a doped bismuth sillenite group substance.

BRIEF DESCRIPTION OF THE DRAWINGS

FIG. 1 is a schematic representation of one embodiment of the present invention; and FIG. 2 shows the sequence of steps for producing a holographic light guide per one embodiment of the present invention.

DETAILED DESCRIPTION OF THE INVENTION

The lattice constants, refractive indexes and melting points of typical bismuth sillenite group substances are listed in Table 1.

TABLE 1

| Composition | Lattice Constant (A) | Refractice index (633 mm) | Melting point (°C.) |
|---|---|---|---|
| $Bi_{12}SiO_{20}$ | 10.10 | 2.5424 | 900 |
| $Bi_{12}GeO_{20}$ | 10.14 | 2.5476 | 935 |
| $Bi_{12}TiO_{20}$ | 10.17 | 2.5619 | 930 |

The substances named in Table 1 exhibit very high photoconductivity for light in the spectrum including ultraviolet rays through blue light and, at the same time, they have a dark resistivity as high as $10^{14}$ Ω-cm. In view of these advantages, they are known to be capable of recording holograms at very high sensitivity. Thus, the combination of at least two of the three substances in Table 1, bismuth silicon oxide $Bi_{12}SiO_{20}$, (hereunder referred to as BSO), bismuth germanium oxide ($Bi_{12}GeO_{20}$, hereunder referred to as BGO) and bismuth titanium oxide ($Bi_{12}TiO_{20}$, hereunder referred to as BTO), has great potential for making holographic light guides. The light guide that guides light to form the hologram preferably has minimum optical loss.

FIG. 1 illustrates the operating theory of the holographic light guide according to the present invention wherein; the numeral 1 represents a substrate, 2 is a light guiding layer formed on the substrate and 3 is a hologram recording layer which is formed by replacing a part of the light guiding layer 2 by a material capable of recording a hologram.

For the purposes of the present invention, the light guiding layer 2 must have a higher refractive index than the substrate 1 and minimum absorption of the light being guided. The holographic recording layer 3 also has a higher refractive index than the substrate but at the same time it must have some photosensitivity. In the arrangement of FIG. 1, laser beams 4 and 5 are routed into the light guiding layer 2 by a conventional prism coupler or some other means and are guided through the light guiding layer 2 and form an interference pattern in the holographic recording layer 3 due to the high photoconductive effect of the bismuth sillenite group substances. If only laser beam 5 is guided through the recording layer as a reconstructing light after the hologram is recorded on the hologram recording layer 3, reconstructed light 7 carrying the information recorded in the hologram is produced in addition to direct transmitted light 6. The holographic light guide thus produced can be packed in an optical IC and used in many applications including as a holographic grating for light diffraction, as a grating light filter and for the one dimensional holographic recording of electrical signals.

As another advantage, the holgrphic light guide of the present invention that uses a bismuth sillenite layer has high crystal symmetry and is stable against heat. In addition hologram recording is electronic, so cyclic erasure and recording can be achieved by simply exposing the entire surface of the device to light. Furthermore, by applying a d.c. electric field to surface electrode 8 (see FIG. 1) from an external power source 9, electron-hole pairs produced by photoconductive effects are efficiently separated into individual electrons and holes to provide a brighter reproduced light 7.

Typical combinations of the holographic light guide according to the present invention are shown in Table 2.

TABLE 2

| Ex. No. | Substrate (1) | Light-guiding layer (2) | Hologram recording layer |
|---|---|---|---|
| 1 | $Bi_{12}SiO_{20}$ | Ga,Ca-doped $Bi_{12}TiO_{20}$ | undoped $Bi_{12}TiO_{20}$ |
| 2 | $Bi_{12}GeO_{20}$ | same as above | same as above |
| 3 | $Bi_{12}SiO_{20}$ | Ga,Ca-doped $Bi_{12}GeO_{20}$ | undoped $Bi_{12}GeO_{20}$ |

In Examples 1 and 2, the substrates are made of BSO and BGO, respectively, which have low refractive indexes as shown in Table 1. If these materials are used as the substrate, an excellent thin film of BTO can be formed by liquid phase epitaxial growth and, since BTO has a higher refractive index than BS or BGO, the thin BTO film provides the desired light guiding layer.

In Example 1, the BSO substrate has a melting point about 30° C. lower than BTO, so the epitaxial layer must be made from a BTO melt with a fairly large content of $Bi_2O_3$ to lower its melting point. This requirement can be met by combining $Bi_2O_3$ with $TiO_2$ in a molar percent ratio of 92:8.

The light guiding layer must have the lowest light absorption, and a light guiding layer that is colorless and transparent in the visible range can be produced by forming an epitaxial layer from a BTO melt doped with 1 to 10 mole percent of Ga and Ca relative to $TiO_2$.

The holographic recording layer must be made of a material that has high photoconductive effects and which has a higher refractive index than the substrate. To this end, undoped BTO having high photoconductive effects in the spectral range of from ultraviolet to blue light (issuing from a He—Cd laser or Ar laser) is used.

Example 3 comprises a BSO substrate, a Ga- and Ca-doped BGO light guiding layer and an undoped BGO holographic recording layer. In Example 3, BGO has a melting point about 35° C. higher than BSO, so, as in Example 1, a light guiding layer is formed by epitaxial growth of a BGO melt with a fairly high $Bi_2O_3$ content.

One embodiment of the process for fabricating the holographic light guide of the present invention is now described by reference to FIG. 2, wherein; FIG. 2 (a) shows a substrate 1 whose top surface is optically polished and FIG. 2 (b) shows a light guiding layer 2 formed on the substrate 1 by epitaxial growth from a Ga- and Ca-doped BTO or BGO melt. Then, as shown in FIG. 2 (c), an open space 10 for forming a holographic recording layer is made in the light guiding layer 2. This space is formed by first making a desired pattern by photoetching and then removing the necessary part of the light guiding layer by chemical etching or sputter etching. Subsequently, as shown in FIG. 2 (d), an epitaxial (hologram recording) layer 3 is formed from an undoped BTO or BGO melt, and the surface of the resulting layer is polished to completely remove the portion which covers the light guiding layer 2. By this procedure, the holographic light guide of FIG. 1 can be produced, but it should be understood that the method of producing the holographic light guide of the present invention is by no means limited to the illustrated example.

As described hereinabove, the present invention is capable of providing a holographic light guide that permits high sensitivity holographic recording, reconstruction and erasure and which can be packed in an optical IC. Such light guide for the present invention can be used with great advantage as a device for optical data processing.

What is claimed is:

1. A method for making a holographic light guide comprising a substrate made of a first bismuth sillenite group substance, a light guiding layer formed on said substrate which is made of a second bismuth sillenite group substance that has a higher refractive index than the first bismuth sillenite group substance, which absorbs little of the light being guided, and a holographic recording layer that partially replaces the light guiding layer and which is made of a third bismuth sillenite group substance having a higher refractive index than the first bismuth sillenite group substances and having a degree of photosensitivity, comprising: growing the light guiding layer on the substrate by epitaxial growth from a melt having a larger content of $Bi_2O_3$ than that of said substrate to lower the melting point of the melt below the melting point of the substrate.

2. A method according to claim 1, wherein the first bismuth sillenite group substance is selected from the group consisting of bismuth silicon oxide ($Bi_{12}SiO_{20}$) and bismuth germanium oxide.

3. A method according to claim 2, wherein the second bismuth sillenite group substance is Ga- and Ca-doped bismuth titanium oxide ($Bi_{12}TiO_{20}$) grown from a $Bi_2O_3/TiO_2$ melt in a molar percent ratio of 92:8.

4. A method according to claim 2, wherein the second bismuth sillenite group substance is Ga- and Ca-doped bismuth germanium oxide ($Bi_{12}GeO_{20}$), and the third bismuth sillenite group substance is undoped bismuth germanium oxide ($Bi_{12}GeO_{20}$).

5. A method according to claim 2, wherein the second bismuth sillenite group substance is Ga- and Ca-doped bismuth silicon oxide ($Bi_{12}SiO_{20}$).

* * * * *